(12) United States Patent
Venkatraman et al.

(10) Patent No.: US 10,098,084 B2
(45) Date of Patent: Oct. 9, 2018

(54) APPARATUS AND METHOD FOR POSITIONING SIGNAL CONTROL FOR A WIRELESS NETWORK

(71) Applicant: Verizon Patent and Licensing Inc., Arlington, VA (US)

(72) Inventors: Shankar Venkatraman, San Jose, CA (US); Jin Yang, Orinda, CA (US); Lei Song, Fremont, CA (US); Yee Sin Chan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/282,035

(22) Filed: Sep. 30, 2016

(65) Prior Publication Data

US 2018/0098300 A1    Apr. 5, 2018

(51) Int. Cl.
*H04W 72/08*    (2009.01)
*H04W 72/04*    (2009.01)
*H04L 5/00*    (2006.01)
*H04W 64/00*    (2009.01)

(52) U.S. Cl.
CPC .......... *H04W 64/00* (2013.01); *H04L 5/0048* (2013.01); *H04W 72/044* (2013.01); *H04W 72/085* (2013.01)

(58) Field of Classification Search
CPC .... H04W 72/085; H04W 4/02; H04L 5/0048; H04L 5/0007
See application file for complete search history.

(56) References Cited

U.S. PATENT DOCUMENTS

| 2007/0032225 | A1* | 2/2007 | Konicek | H04M 1/72513 455/417 |
|---|---|---|---|---|
| 2015/0011238 | A1* | 1/2015 | Tujkovic | H04W 4/02 455/456.1 |
| 2015/0029874 | A1* | 1/2015 | Davydov | H04W 28/24 370/252 |
| 2015/0230112 | A1* | 8/2015 | Siomina | G01S 5/0205 370/252 |
| 2015/0365790 | A1* | 12/2015 | Edge | H04W 72/1263 455/404.2 |
| 2016/0248563 | A1* | 8/2016 | Behravan | H04L 5/0087 |
| 2017/0230852 | A1* | 8/2017 | You | H04W 24/08 |

* cited by examiner

*Primary Examiner* — Asghar Bilgrami

(57) ABSTRACT

A device may determine a set of characteristics of a network. The set of characteristics may relate to a set of wireless devices connected to the network. The device may alter a network configuration associated with a set of positioning reference signals (PRS signals) transmitted via the network based on the set of characteristics of the network. The alteration may relate to a characteristic of the set of PRS signals or a resource allocation for providing the set of PRS signals via the network. The device may transmit the set of PRS signals based on altering the network configuration to enable geolocation to be performed by the set of wireless devices connected to the network.

20 Claims, 7 Drawing Sheets

APPARATUS AND METHOD FOR POSITIONING SIGNAL CONTROL FOR A WIRELESS NETWORK

BACKGROUND

The Internet of Things (IoT) is a network of physical devices that are embedded with machine devices, (e.g., sensor devices, actuator devices, or wireless devices) and network connectivity to enable the physical devices to collect and exchange data. IoT devices are used in energy grid monitoring, transportation monitoring, home appliances, personal tracking, smart metering, or the like. Machine devices may be lower cost, have greater battery life, and support lower data rates relative to mobile devices.

DETAILED DESCRIPTION OF PREFERRED EMBODIMENTS

The following detailed description of example implementations refers to the accompanying drawings. The same reference numbers in different drawings may identify the same or similar elements.

A group of machine devices may be deployed in a particular geographic location. The machine devices may be configured to utilize a narrow bandwidth for communication relative to long term evolution (LTE)-connected mobile devices. For example, LTE-connected mobile devices may utilize bandwidths ranging from 1.4 megahertz (MHz) to 20 MHz and may utilize a carrier aggregation functionality to increase an effective bandwidth. As a comparison, machine devices (e.g., Cat-M devices) may operate on a smaller bandwidth of 1080 kilohertz (kHz). Similarly, other machine devices (e.g., NarrowBand Internet of Things (NB-IoT)) devices may operate on a bandwidth of as little as 200 kHz.

LTE-connected mobile devices may utilize a set of positioning reference signals (referred to herein as PRS, PRSs, or PRS signals) and an observed time difference of arrival (OTDOA) procedure to perform geolocation and determine a position. For example, an LTE-connected mobile device may determine a time difference in a first PRS signal associated with a first cell, a second PRS signal associated with a second cell, a third PRS signal associated with a third cell, or the like, and may perform trilateration to determine a position of the LTE-connected mobile device. The accuracy of trilateration may relate to a signal to noise ratio (SNR) condition for the PRS signal, usage of a high bandwidth signal for sounding, or the like. Because machine devices utilize smaller bandwidths, the accuracy of geolocation of the machine devices may be reduced relative to an accuracy measurement of geolocation for the LTE-connected mobile devices.

In implementations described herein, a network management device may implement one or more alterations to a network configuration to improve an accuracy of geolocation for machine devices using PRS signals. For example, the network management device permits different qualities of service for different wireless devices (e.g., relatively high accuracy geolocation for high bandwidth or high quality of service (QoS) wireless devices, such as user equipment (UE), and relatively low accuracy geolocation for low bandwidth or low QoS wireless devices, such as IoT devices).

Figure 1A:
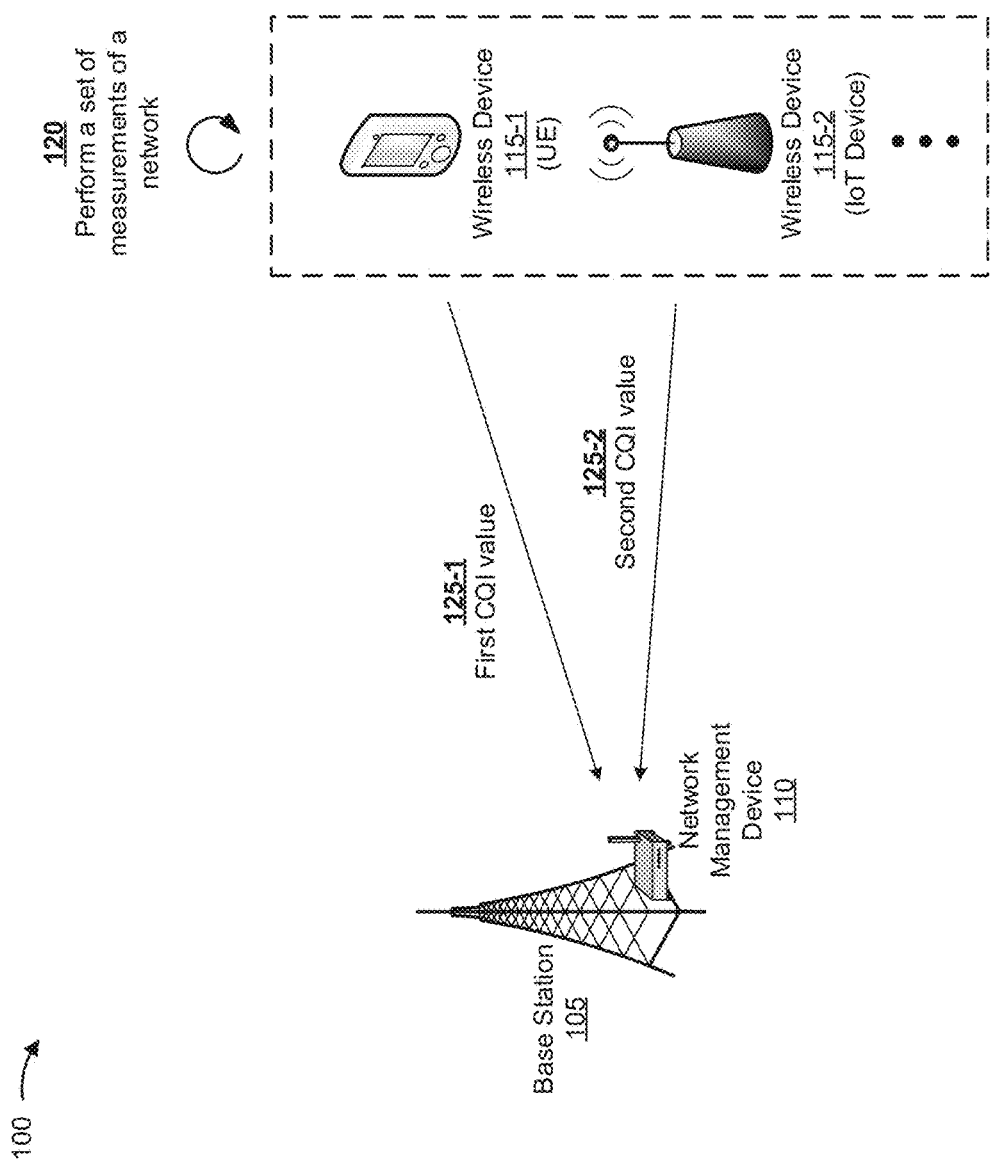
FIGS. 1A-1D are diagrams of an overview of an example implementation described herein.

FIGS. 1A-1D are diagrams of an overview of an example implementation 100 described herein. As shown in FIG. 1A, example implementation 100 includes base station 105 and network management device 110. Example implementation 100 also includes a group of wireless devices 115 (e.g., wireless device 115-1 (a UE) and wireless device 115-2 (an IoT device)). The IoT device may be a narrowband device, such as a sensor device, an actuator device, a control device, or the like.

As shown in FIG. 1A, network management device 110 may determine a set of characteristics of a network or of a set of wireless devices connected to the network. The set of characteristics may relate to a network load or a location accuracy requirement.

For example, and as shown by reference number 120, wireless devices 115 perform a set of measurements of a network. Measurements may include a determination of a signal to noise ratio (SNR), a network load, a signal strength, a bit error rate, or the like. As shown by reference number 125-1, wireless devices 115 provide a first channel quality indicator (CQI) value to network management device 110 via base station 105. As shown by reference number 125-2, wireless devices 115 provide a second CQI value to network management device 110 via base station 105.

In some implementations, wireless devices 115 may provide the first and second CQI values based on the set of measurements. Additionally, or alternatively, wireless devices 115 may provide information identifying the set of measurements, and network management device 110 may determine the first and second CQI values based on the information.

Figure 1B:
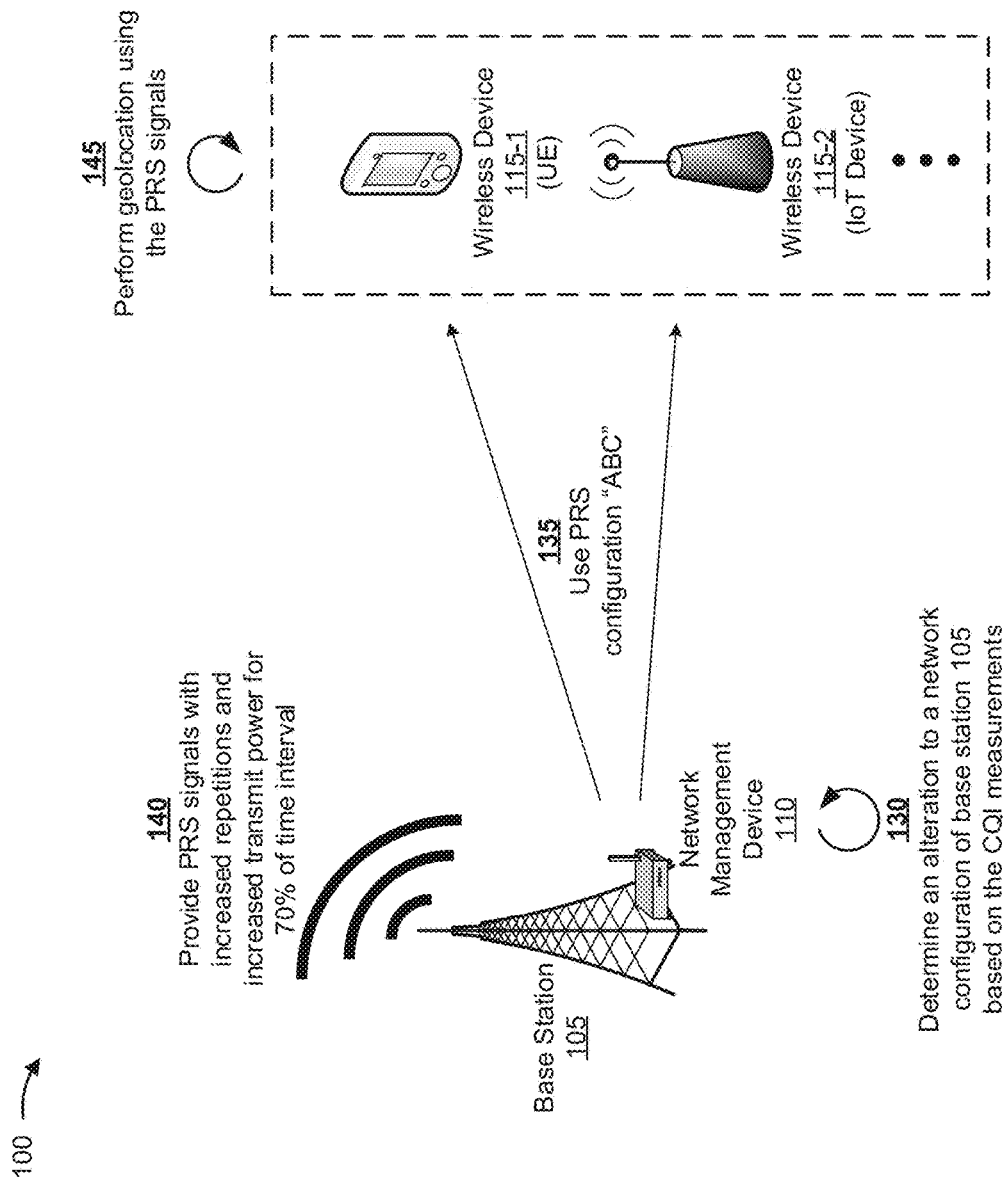

As shown in FIG. 1B, network management device 110 may determine an alteration to a network configuration associated with a set of PRS signals transmitted via the network. The alteration may relate to a characteristic of the set of PRS signals or a resource allocation for providing the set of PRS signals via the network. Network management device 110 may transmit one or more signaling messages to cause the alteration to the network configuration to be implemented by one or more base stations of the network. The one or more base stations of the network may be caused to transmit the set of PRS signals based on the alteration to the network configuration to enable geolocation to be performed by the set of wireless devices connected to the network.

For example, and as shown by reference number 130, network management device 110 may determine an alteration to a network configuration of base station 105 based on the CQI values and information identifying wireless devices 115. The information for wireless devices 115 may identify a type of wireless device, a QOS parameter for a wireless device, or the like.

In some implementations, based on determining that a majority of wireless devices 115 are UEs using a relatively high level of accuracy of geolocation, network management device 110 may select a network configuration to cause base station 105 to use a high accuracy configuration for a majority of a time interval and switch to a low accuracy configuration for a minority of the time interval. Additionally, or alternatively, based on determining that a majority of wireless devices 115 are IoT devices using a relatively low level of accuracy of geolocation, network management device 110 may select a network configuration to cause base station 105 to use a low accuracy configuration for a majority of a time interval and switch to a high accuracy configuration for a minority of the time interval.

As shown by reference number 135, network management device 110 may cause base station 105 to transmit information identifying a particular network configuration for PRS signals (e.g., ABC). For example, network management device 110 may indicate that for a first percentage of a time interval, the PRS signals will be associated with an increased quantity of repetitions and an increased transmit power relative to a PRS configuration being provided for a second percentage of the time interval.

As shown by reference number 140, base station 105, for example, may provide PRS signals with increased repetitions and increased transmit power for 70% of a time interval relative to PRS signals provided for a remaining 30% of the time interval. It is to be understood that the percentages are for illustrative purposes only and other combinations are possible. In some implementations, network management device 110 may cause base station 105 to provide the PRS signals.

As shown by reference number 145, wireless devices 115 may receive the PRS signals and perform geolocation using the PRS signals. In some implementations, wireless device 115-1 (a UE) may perform geolocation based on PRS signals received during a first percentage of a time interval and wireless device 115-2 (an IoT device) may perform geolocation based on PRS signals received during a second percentage of the time interval.

Figure 1C:
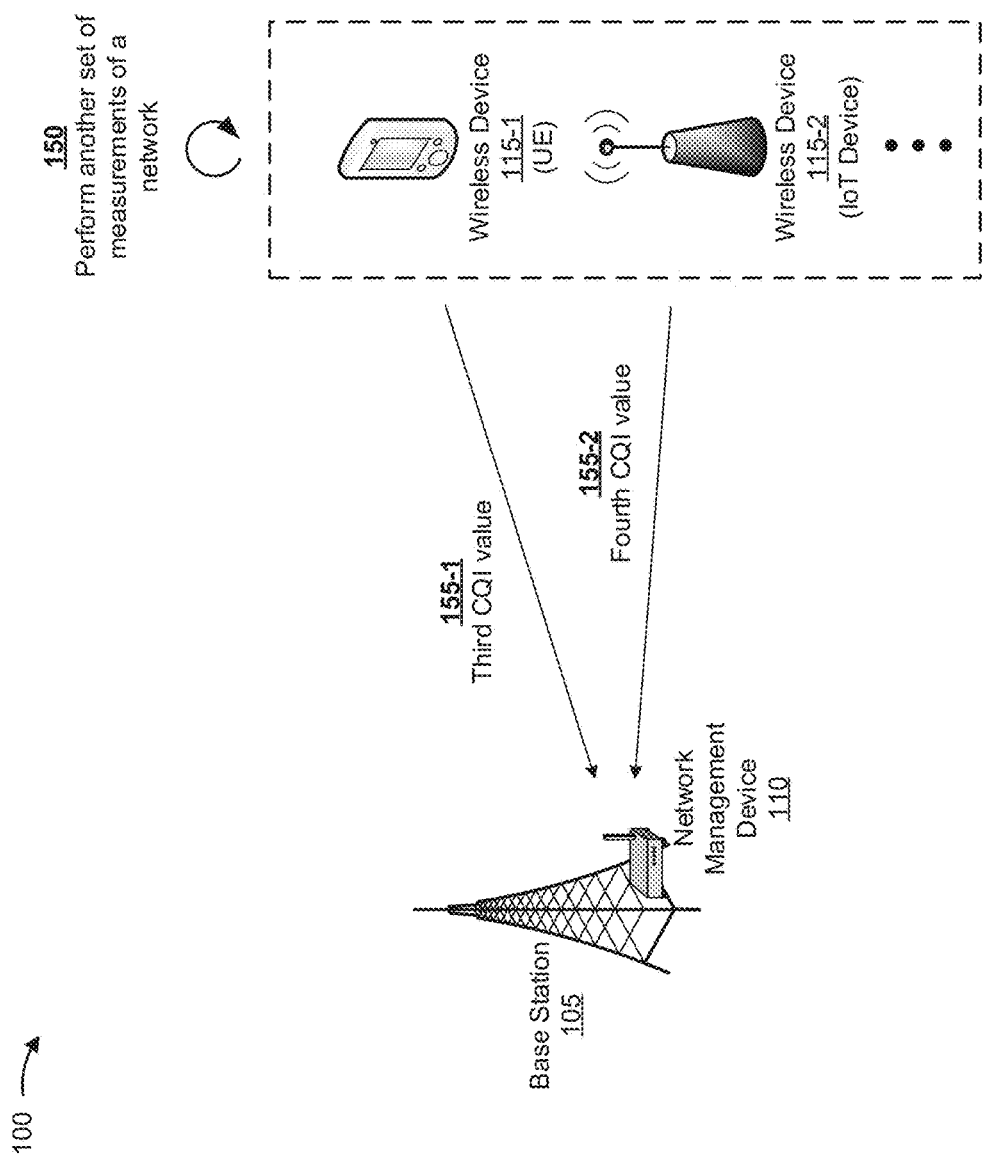

As shown in FIG. 1C, and as shown by reference number 150, wireless devices 115 may perform another set of measurements of a network. Measurements may include signal to noise ratios (SNRs), network loads, signal strengths, bit error rates, or the like. As shown by reference number 155-1, wireless devices 115 may provide a third CQI value to network management device 110 via base station 105. As shown by reference number 155-2, wireless devices 115 may provide a fourth CQI value to network management device 110 via base station 105.

Assume that network management device 110 determines that a location accuracy of locations determined using geolocation fails to satisfy a threshold based on the third CQI value and the fourth CQI value. For example, network management device 110 may determine that a SNR of the PRS signals fails to satisfy a threshold associated with permitting geolocation to be performed with a threshold accuracy.

Figure 1D:
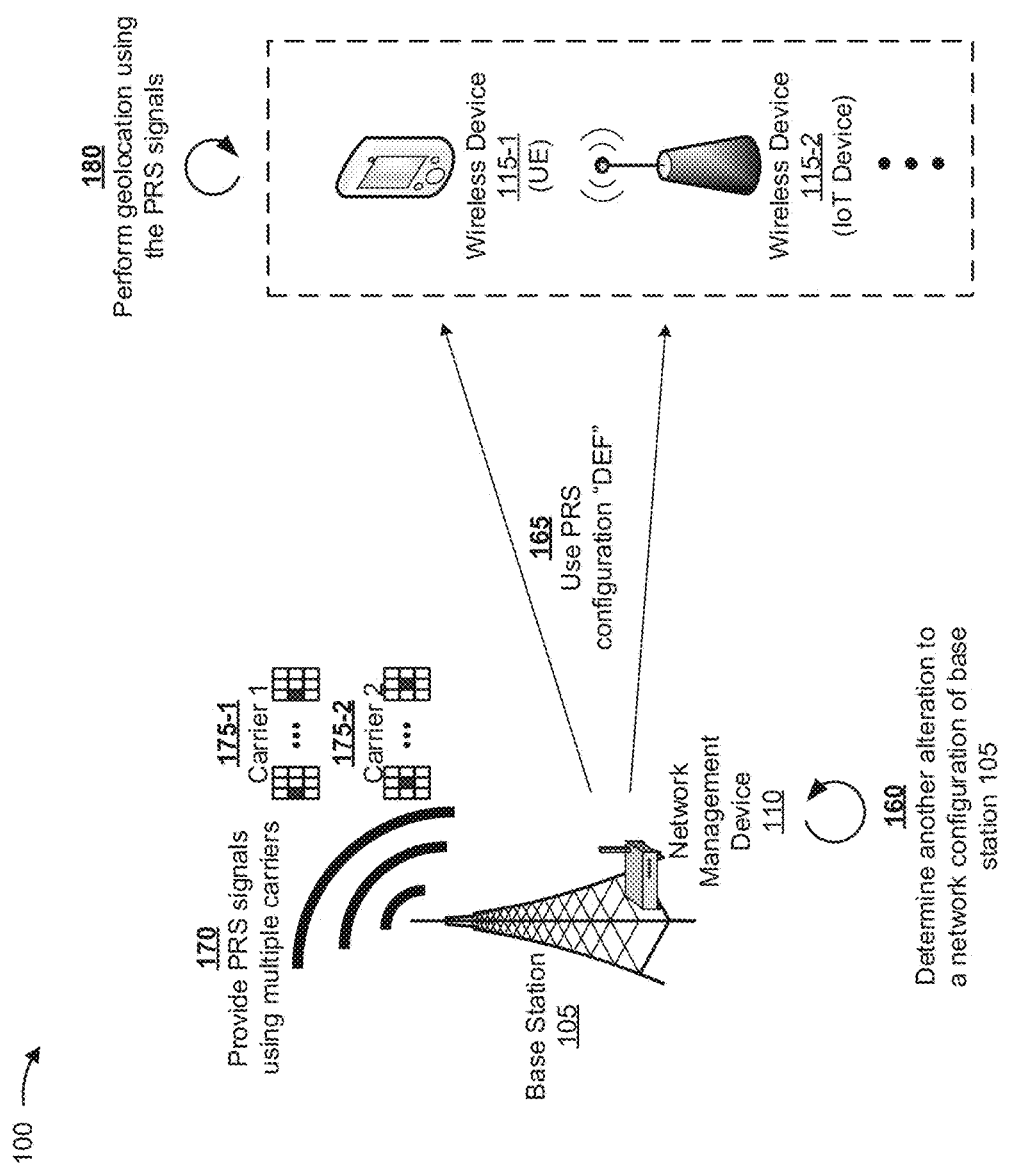

As shown in FIG. 1D, network management device 110 may cause multiple PRS signals to be provided via multiple carrier slots for aggregation by the group of wireless devices 115. In this way, network management device 110 permits geolocation to be performed with an increased accuracy relative to another network configuration despite wireless device 115-2 being a narrowband type of wireless device (e.g., an IoT device).

As shown by reference number 160, network management device 110 may determine another alteration to a network configuration of base station 105. As shown by reference number 165, network management device 110 may cause base station 105 to provide an indication of the alteration to the network configuration associated with providing PRS signals. For example, network management device 110 may cause base station 105 to indicate to wireless devices 115 that base station 105 is to use another network configuration (e.g., DEF).

As shown by reference number 170, network management device 110 may cause base station 105 to provide PRS signals using multiple carriers. The multiple carriers include carrier 1, as shown by reference number 175-1 and carrier 2, as shown by reference number 175-2. In carriers 1 and 2, the time slots for the PRSs are represented by the black squares.

As shown by reference number 180, wireless devices 115 may perform geolocation using the PRS signals. Based on receiving information identifying PRS configuration DEF, wireless devices 115 may switch carriers to receive the multiple PRS signals provided via the multiple time slots of the multiple carriers 175, and may perform geolocation using the multiple PRS signals.

In this way, an accuracy of geolocation for machine devices using PRS signals is improved by permitting different qualities of service for different wireless devices 115 (e.g., high accuracy geolocation for high bandwidth or high QoS wireless devices 115 like user equipment (UE) and low accuracy geolocation for low bandwidth or low QoS wireless devices 115 like IoT devices).

As indicated above, FIGS. 1A-1D are provided merely as an example. Other examples are possible and may differ from what was described with regard to FIGS. 1A-1D.

Figure 2:
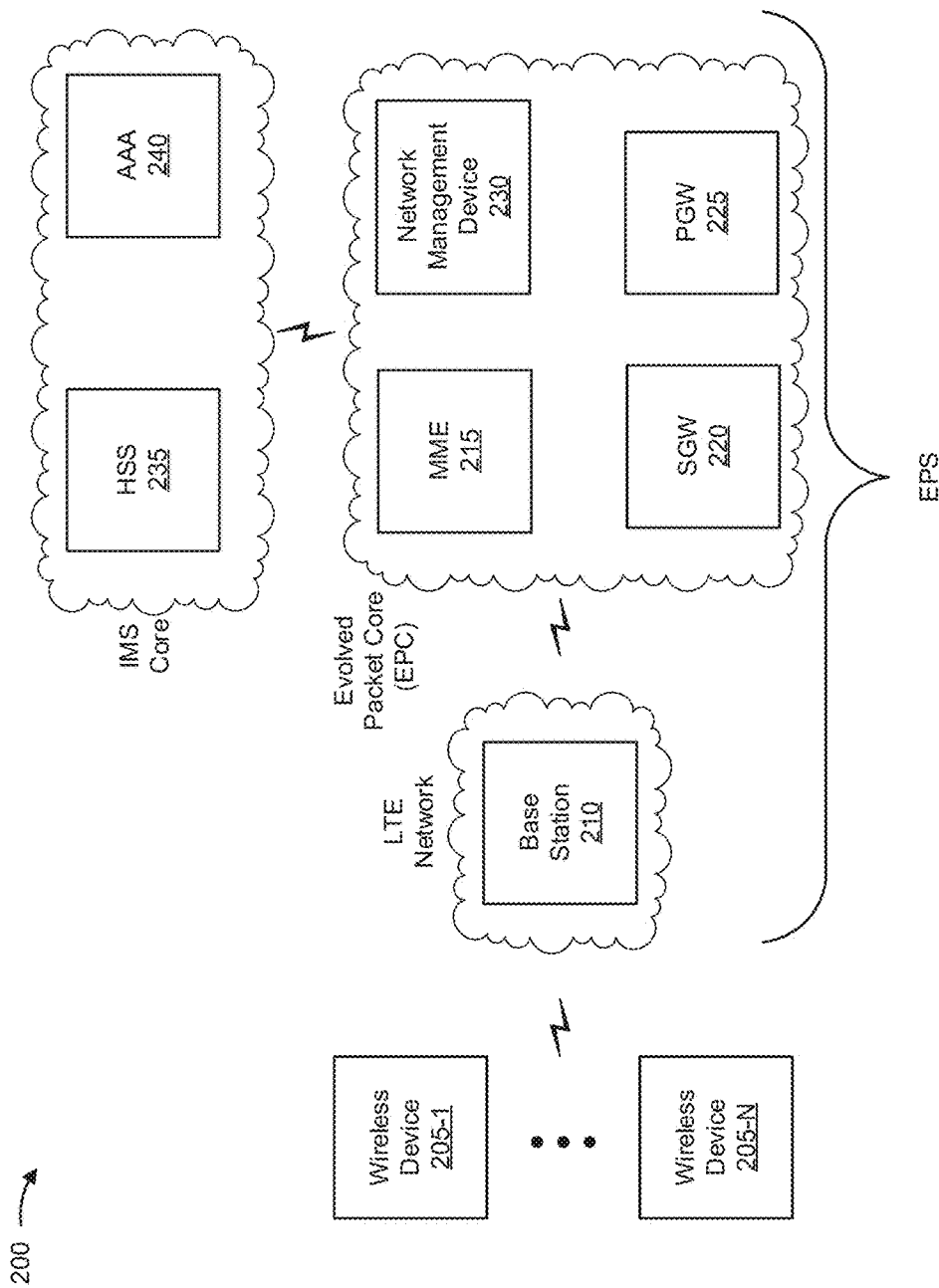
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more wireless devices 205-1 through 205-N (N≥1) (hereinafter referred to collectively as "wireless devices 205," and individual as "wireless device 205"); a base station 210; a mobility management entity device (MME) 215; a serving gateway (SGW) 220; a packet data network gateway (PGW) 225; a network management device 230; a home subscriber server (HSS) 235; and an authentication, authorization, and accounting server (AAA) 240. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which wireless device 205 communicates with the EPC. The EPC may include MME 215, SGW 220, PGW 225, and/or network management device 230 that enable wireless device 205 to communicate with the network and/or an Internet protocol (IP) multimedia subsystem (IMS) core. The IMS core may include HSS 235 and/or AAA 240, and may manage device registration and authentication, session initiation, etc., associated with wireless devices 205. HSS 235 and/or AAA 240 may reside in the EPC and/or the IMS core.

Wireless devices 205 includes one or more devices capable of communicating with base station 210 and/or a network. For example, wireless device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. Wireless device 205 may send traffic to and/or receive traffic from the network (e.g., via base station 210, SGW 220, and/or PGW 225). In some implementations, wireless device 205 may include a user device type of wireless device 205, such as a user equipment (UE), a mobile device, or the like. Additionally, or alternatively, wireless device 205 may include a machine device type of wireless device, such as an Internet of Things (IoT) type of device, a Category M1 (Cat-M1) device, a narrow band IoT (NB-IoT) device, or the like. In some implementations, wireless device 205 may be associated with a particular quality of service (QoS) classification.

Base station 210 includes one or more devices capable of transferring traffic, such as audio, video, text, and/or other traffic, destined for and/or received from wireless device 205. In some implementations, base station 210 may include an eNB associated with the LTE network that receives traffic from and/or sends traffic to the network via SGW 220 and/or PGW 225. Additionally, or alternatively, one or more base stations 210 may be associated with a RAN that is not associated with the LTE network. Base station 210 may send traffic to and/or receive traffic from wireless device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with wireless device 205. In some implementations, MME 215 may perform operations relating to authentication of wireless device 205. Additionally, or alternatively, MME 215 may facilitate the selection of a particular SGW 220 and/or a particular PGW 225 to serve traffic to and/or from wireless device 205. MME 215 may perform operations associated with handing off wireless device 205 from a first base station 210 to a second base station 210 when wireless device 205 is transitioning from a first cell associated with the first base station 210 to a second cell associated with the second base station 210. Additionally, or alternatively, MME 215 may select another MME (not pictured), to which wireless device 205 should be handed off (e.g., when wireless device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to the network (e.g., via PGW 225) and/or other network devices associated with the EPC and/or the IMS core. SGW 220 may also receive traffic from the network and/or other network devices, and may send the received traffic to wireless device 205 via base station 210. Additionally, or alternatively, SGW 220 may perform operations associated with handing off wireless device 205 to and/or from an LTE network.

PGW 225 includes one or more devices capable of providing connectivity for wireless device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to the network. Additionally, or alternatively, PGW 225 may receive traffic from the network, and may send the traffic to wireless device 205 via SGW 220 and base station 210. PGW 225 may record data usage information (e.g., byte usage), and may provide the data usage information to AAA 240.

Network management device 230 includes one or more devices capable of managing a network. For example, network management device 230 may include a server that controls a configuration of one or more network devices (e.g., one or more wireless devices 205 or one or more base stations 210), such as a configuration relating to performing geolocation or the like. In some implementations, network management device 230 may control one or more parameters relating to a positioning reference signal (PRS signal) provided by base station 210 to permit wireless device 205 to perform geolocation. In some implementations, network management device 230 may reside in base station 210. For example, network management device 230 may be a self-organizing network (SON) functionality of base station 210.

HSS 235 includes one or more devices, such as one or more server devices, capable of managing (e.g., receiving, generating, storing, processing, and/or providing) information associated with wireless device 205. For example, HSS 235 may manage subscription information associated with wireless device 205, such as information that identifies a subscriber profile of a user associated with wireless device 205, information that identifies services and/or applications that are accessible to wireless device 205, location information associated with wireless device 205, a network identifier (e.g., a network address) that identifies wireless device 205, information that identifies a treatment of wireless device 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

AAA 240 includes one or more devices, such as one or more server devices, that perform authentication, authorization, and/or accounting operations for communication sessions associated with wireless device 205. For example, AAA 240 may perform authentication operations for wireless device 205 and/or a user of wireless device 205 (e.g., using one or more credentials), may control access, by wireless device 205, to a service and/or an application (e.g., based on one or more restrictions, such as time-of-day restrictions, location restrictions, single or multiple access restrictions, read/write restrictions, etc.), may track resources consumed by wireless device 205 (e.g., a quantity of voice minutes consumed, a quantity of data consumed, etc.), and/or may perform similar operations.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
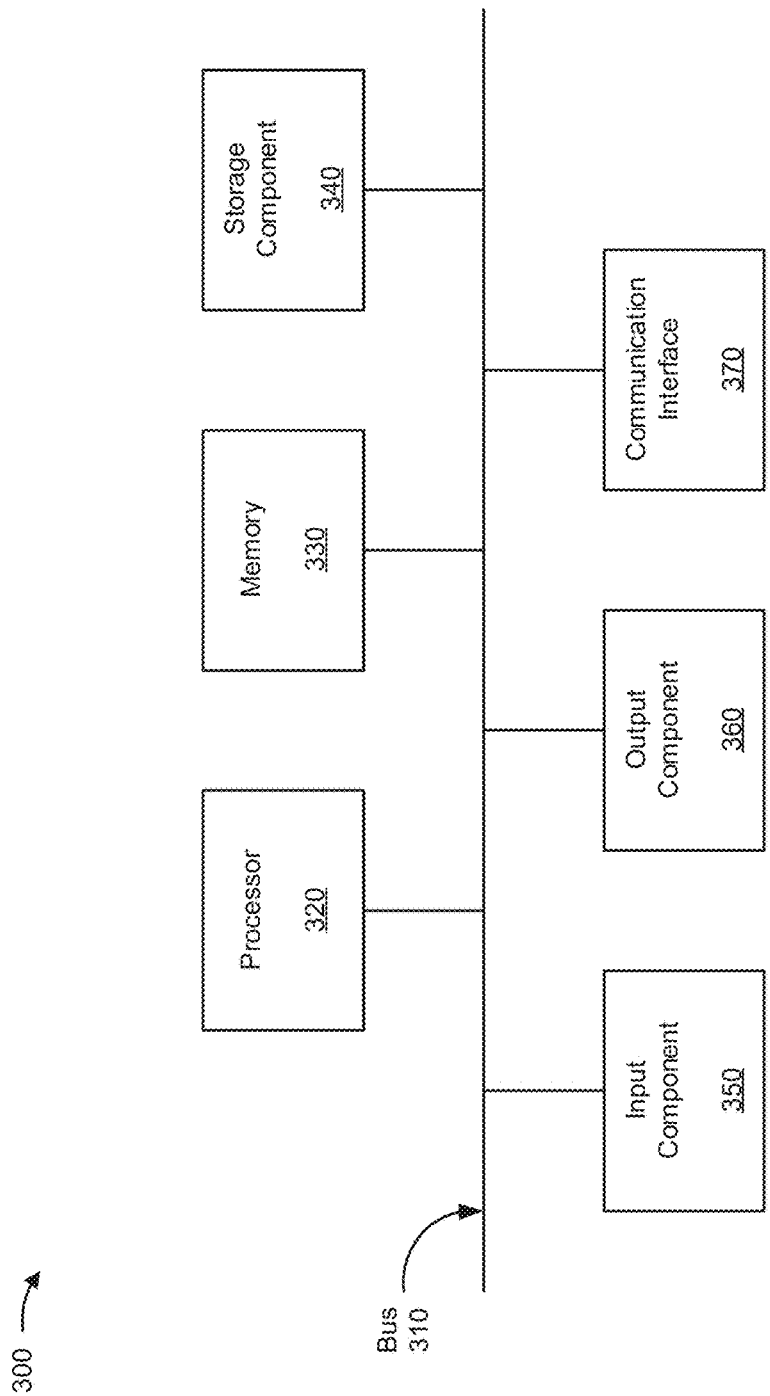
FIG. 3 is a diagram of example components of one or more devices of FIG. 2.

FIG. 3 is a diagram of example components of a device 300. Device 300 may correspond to wireless device 205, base station 210, MME 215, SGW 220, PGW 225, network management device 230, HSS 235, and/or AAA 240. In some implementations, wireless device 205, base station 210, MME 215, SGW 220, PGW 225, network management device 230, HSS 235, and/or AAA 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
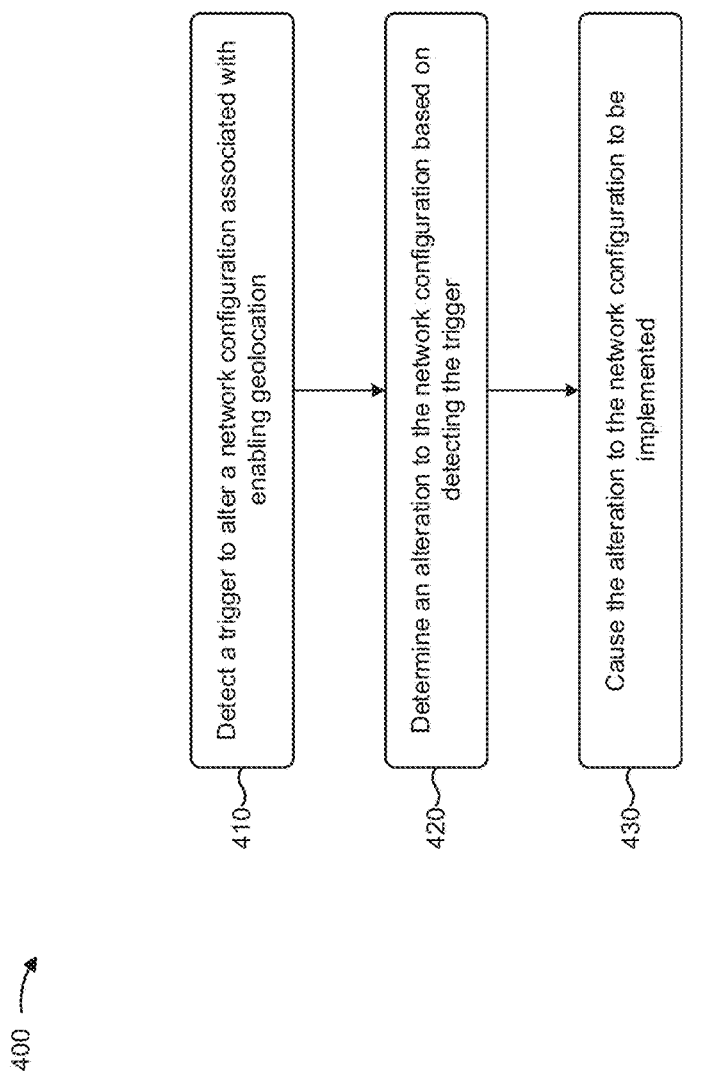
FIG. 4 is a flow chart of an example process for controlling a positioning signal for a wireless network.

FIG. 4 is a flow chart of an example process 400 for controlling a positioning signal for a wireless network. In some implementations, one or more process blocks of FIG. 4 may be performed by network management device 230. In some implementations, one or more process blocks of FIG. 4 may be performed by another device or a group of devices separate from or including network management device 230, such as wireless device 205, base station 210, MME 215, SGW 220, PGW 225, HSS 235, and/or AAA 240.

As shown in FIG. 4, process 400 may include detecting a trigger to alter a network configuration associated with enabling geolocation (block 410). For example, network management device 230 may detect a trigger to alter a network configuration associated with enabling geolocation. As explained below, there are various events that may cause a trigger to occur.

In some implementations, network management device 230 may detect that wireless device 205 has connected to the network. Wireless device 205 may be a different type of wireless device 205 from other wireless devices 205 connected to the network (e.g., a wireless device 205 that uses a different position accuracy, bandwidth availability, quantity of receive antennas, or the like). Additionally, or alternatively, the detected wireless device 205 may cause a threshold quantity of wireless devices 205 to be satisfied.

In some implementations, a trigger may be that network management device 230 has determined that a network measurement satisfies a threshold. For example, network management device 230 may determine that an SNR, a data throughput, a network load, a CQI, a signal to interference plus noise ratio (SINR), a signal strength (e.g., detected at a particular location, such as a cell edge), or the like satisfies a threshold.

In some implementations, network management device 230 may detect a trigger periodically. For example, network management device 230 may detect a trigger after a threshold period of time has elapsed.

In some implementations, network management device 230 may detect a trigger based on receiving a request for positioning information. For example, in some implementations, network management device 230 may detect a trigger based on wireless device 205 requesting information to perform a geolocation.

In some implementations, a network configuration may be a configuration associated with a PRS signal. For example, a network configuration may be a configuration of base station 210, wireless device 205, or the like.

Next, process 400 may include determining an alteration to the network configuration based on detecting the trigger (block 420). For example, network management device 230 may determine an alteration to the network configuration based on detecting the trigger.

In some implementations, network management device 230 may determine one of more network measurements, and may determine the alteration based on the one or more network measurements. For example, network management device 230 may increase a quantity of repetitions, increase a transmit power, alter a carrier allocation, increase a PRS bandwidth (e.g., via enabling PRS signal hopping or utilizing multiple time slots for PRS signals), may aggregate carriers, or the like based on one or more network measurements indicating a quality of PRS signals being provided to wireless devices 205.

In some implementations, network management device 230 may determine one of more characteristics of one or more wireless devices 205 connected to the network, and may determine the alteration based on the one or more characteristics. For example, network management device 230 may determine a location accuracy requirement and/or a QoS classification for a particular wireless device 205, and may configure the network to provide PRS signals associated with satisfying the location accuracy requirement and/or corresponding to the QoS classification.

In some implementations, based on wireless device 205 requiring a threshold geolocation accuracy (e.g., CAT 1, 2, 3, . . . wireless devices), network management device 230 may select a first set of characteristics for a PRS signal. The first set of characteristics may be relatively high bandwidth, relatively low repetitions, relatively low energy per resource element (EPRE), or the like. Additionally, or alternatively, based on wireless device 205 requiring another geolocation accuracy not satisfying the threshold (e.g., CAT-M, NB-IoT wireless devices), network management device 230 may select a second set of characteristics for the PRS signal. The second set of characteristics may be relatively low bandwidth, high repetitions, high EPRE, or the like.

In some implementations, network management device 230 may determine the alteration, and may alter use of a particular configuration. For example, based on detecting a majority of high bandwidth wireless devices 205, network management device 230 may increase an amount of time of a time interval that base station 210 provides PRS signals that are receivable by high bandwidth wireless devices 205. Additionally, or alternatively, based on a majority of low bandwidth wireless devices 205, network management device 230 may increase amount of time of the time interval that base station 210 provides PRS signals that are receivable by low bandwidth wireless devices 205.

In some implementations, network management device 230 may alter a set of characteristics of a PRS signal. For example, network management device 230 may alter a PRS signal periodicity, a quantity of repetitions, a bandwidth, an EPRE, or the like. Additionally, or alternatively, network management device 230 may cause base station 210 to provide multiple PRS signals. For example, network management device 230 may transmit multiple PRS signal channels, each conveying a PRS signal with a different set of characteristics.

In some implementations, network management device 230 may cause a wireless device 205 to receive a particular channel. For example, network management device 230 may alter a network configuration of a low bandwidth wireless device 205 to receive a first PRS signal via a first PRS process that is associated with a set of characteristics selected for the low bandwidth wireless devices 205. Similarly, network management device 230 may alter a network configuration of high bandwidth wireless devices 205 to receive a second PRS signal via a second PRS process that is associated with a set of characteristics selected for the high bandwidth wireless devices 205. In some implementations, network management device 230 may cause a wireless device 205 to receive multiple PRS signals via multiple PRS processes. In this way, network management device 230 improves to improve geolocation accuracy for wireless device 205.

In some implementations, network management device 230 may cause an alteration to carriers or subcarriers for PRS signals. For example, network management device 230 may adaptively increase or decrease a quantity of carriers for PRS signals. Additionally, or alternatively, network management device 230 may cause wireless device 205 to utilize a PRS resource on a particular carrier based on network traffic. For example, network management device 230 may determine to cause wireless device 205 to transfer from a PRS signal on a more loaded carrier to a PRS signal on a less loaded carrier. Additionally, or alternatively, network management device 230 may cause wireless device 205 to utilize a PRS resource on a particular carrier based on a location of wireless device 205. For example, network management device 230 may cause wireless device 205 to utilize a PRS carrier that has characteristics for good propagation when at a cell edge and to utilize a PRS carrier with characteristics for good accuracy when at a cell center. Additionally, or alternatively, network management device 230 may alter a power assigned to a carrier based on a wireless device 205 power measurement of the carrier. For example, network management device 230 may select a first threshold SINR associated with first threshold power level and a second threshold SINR associated with second threshold power level.

In some implementations, network management device 230 may increase a PRS bandwidth. For example, network management device 230 may determine to cause the PRS signals to be provided via multiple time slots and/or cause an alteration to a set of time slots utilized for a PRS signal. Additionally, or alternatively, network management device 230 may cause a PRS signal to be provided on multiple carriers in multiple time slots (e.g., adjacent time slots).

In some implementations, network management device 230 may enable PRS hopping. For example, network management device 230 may determine to cause an alteration to a set of wavelength bands to which a wireless device 205 is tuned to cause wireless device 205 to receive multiple PRS signals via the multiple wavelength bands. In some implementations, network management device 230 may cause multiple PRS signals to be provided via multiple non-overlapping sub-bands across multiple time intervals. For example, network management device 230 may allocate a set of dedicated data sub-channels (e.g., physical downlink shared subchannels (PDSCH)) for a group of wireless devices 205 to receive multiple PRS signals to improve geolocation accuracy for the group of wireless devices 205.

As further shown in FIG. 4, process 400 may include causing the alteration to the network configuration to be implemented (block 430). For example, network management device 230 may cause the alteration to the network configuration to be implemented.

In some implementations, network management device 230 may transmit a signaling message to cause the alteration to the network configuration to be implemented. For example, network management device 230 may utilize radio resource control (RRC) signaling or observed time difference of arrival (OTDOA) signaling to cause the alteration to the network configuration to be implemented.

In some implementations, network management device 230 may cause base station 210 to transmit PRS signals using the network configuration. For example, network management device 230 may cause base station 210 to transmit PRS signals using a particular set of PRS signal characteristics. As another example, network management device 230 may cause base station 210 to transmit PRS signals via a particular set of carriers. As another example, network management device 230 may cause base station 210 to transmit PRS signals using a particular set of time slots.

In some implementations, network management device 230 may cause base station 210 to transmit PRS signals with a particular set of identifiers. A first identifier may indicate that a PRS signal is to be utilized by first type of wireless device 205 and a second identifier may indicate that a PRS signal is to be utilized by second type of wireless device 205.

In some implementations, network management device 230 may continue to monitor the network to alter the network configuration. For example, after causing base station 210 to transmit a first set of PRS signals, network management device 230 may receive updated information regarding a network, may cause another alteration to a network configuration, and may cause base station 210 to transmit a second set of PRS signals using the altered network configuration. In this case, network management device 230 may iteratively alter the network configuration (e.g., by causing a first alteration, followed by a second alteration, followed by a third alteration, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, an accuracy of geolocation for machine devices using PRS signals is improved by permitting different network configurations for different wireless devices (e.g., high accuracy geolocation for high bandwidth or high QoS wireless devices like UEs and low accuracy geolocation for low bandwidth or low QoS wireless devices like IoT devices).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 one or more memories; and
 one or more processors, communicatively coupled to the one or more memories, to:
  determine a set of characteristics of a network,
   the set of characteristics relating to a set of wireless devices connected to the network,
    the set of wireless devices including a first type of wireless device and a second type of wireless device,
     the first type of wireless device being a different type of wireless device than the second type of wireless device;
  determine a ratio of the first type of wireless device of the set of wireless devices to the second type of wireless device of the set of wireless devices,
   the first type of wireless device being associated with a first location accuracy requirement,
   the second type of wireless device being associated with a second location accuracy requirement;

determine an alteration to a network configuration associated with a set of positioning reference signals (PRS signals) transmitted via the network,
  the alteration relating to a characteristic of the set of PRS signals or a resource allocation for providing the set of PRS signals via the network, and
  the network configuration including:
    a first network configuration, and
    a second network configuration,
      the first network configuration being associated with the first type of wireless device of the set of wireless devices,
      the second network configuration being associated with the second type of wireless device of the set of wireless devices, and
      the first network configuration being different than the second network configuration; and
transmit one or more signaling messages to cause the alteration to the network configuration to be implemented by one or more base stations of the network,
  the one or more signaling messages being associated with causing the one or more base stations of the network to transmit the set of PRS signals using multiple carriers based on the alteration to the network configuration to enable geolocation to be performed by the set of wireless devices connected to the network, and
  the one or more signaling messages causing a particular base station, of the one or more base stations, to transmit a first portion of the set of PRS signals using the first network configuration corresponding to the first location accuracy requirement for a first period of time of a time interval and a second portion of the set of PRS signals using the second network configuration for a second period of time of the time interval,
    the first period of time and the second period of time corresponding to the ratio of the first type of wireless device to the second type of wireless device.

2. The device of claim 1, where the one or more processors, when determining the alteration to the network configuration, are to:
  determine to alter at least one of:
    a quantity of repetitions of the set of PRS signals,
    a transmission power of the set of PRS signals,
    a set of frequencies or a set of carriers via which the set of PRS signals are provided,
    a time slot of the set of PRS signals, or
    a bandwidth allocated to the set of PRS signals.

3. The device of claim 1, where the one or more processors are further to:
  select a first portion of the time interval for the first portion of the set of PRS signals and a second portion of the time interval for the second portion of the set of PRS signals based on the ratio of the first type of wireless device to the second type of wireless device; and
  provide information identifying a length of the first portion of the time interval and the second portion of the time interval.

4. The device of claim 1, where the set of characteristics include at least one of:
  a type of the set of wireless devices,
  a network load,
  a signal to interference plus noise ratio (SINR),
  a location accuracy requirement, or
  a location error.

5. The device of claim 1, where the one or more processors, when determining the alteration to the network configuration, are to:
  select a plurality of positioning reference signal processes (PRS processes),
    each PRS process, of the plurality of PRS processes, being associated with a different configuration,
    each PRS process, of the plurality of PRS processes, being associated with a positioning reference signal channel (PRS channel); and
  where the one or more processors, when transmitting the one or more signaling messages, are to:
    transmit the one or more signaling messages to cause the one or more base stations to transmit the set of PRS signals via a set of PRS channels and to cause a particular wireless device, of the set of wireless devices, to receive the set of PRS signals via the set of PRS channels.

6. The device of claim 1, where the one or more processors, when determining the alteration to the network configuration, are to:
  select the multiple carriers via which to provide the set of PRS signals; and
  where the one or more processors, when transmitting the one or more signaling messages, are to:
    cause the set of wireless devices to receive the set of PRS signals via the multiple carriers.

7. A non-transitory computer-readable medium storing instructions, the instructions comprising:
  one or more instructions that, when executed by one or more processors, cause the one or more processors to:
    determine a set of characteristics of a network,
      the set of characteristics relating to a set of wireless devices connected to the network,
        the set of wireless devices including a first type of wireless device and a second type of wireless device,
          the first type of wireless device being a different type of wireless device than the second type of wireless device;
    determine a ratio of the first type of wireless device of the set of wireless devices to the second type of wireless device of the set of wireless devices,
      the first type of wireless device being associated with a first location accuracy requirement,
      the second type of wireless device being associated with a second location accuracy requirement;
    determine an alteration to a network configuration associated with a set of positioning reference signals (PRS signals) transmitted via the network,
      the alteration relating to a characteristic of the set of PRS signals or a resource allocation for providing the set of PRS signals via the network, and
      the network configuration including a first network configuration and a second network configuration,
        the first network configuration being associated with the first type of wireless device of the set of wireless devices,
        the second network configuration being associated with the second type of wireless device of the set of wireless devices, and
        the first network configuration being different than the second network configuration; and
    transmit the set of PRS signals, using multiple carriers, based on the alteration to the network configuration to enable geolocation to be performed by the set of wireless devices connected to the network,
a first portion of the set of PRS signals being transmitted using the first network configuration corresponding to the first location accuracy requirement for a first period of time of a time interval and a second portion of the set of PRS signals being transmitted using the second network configuration for a second period of time of the time interval,
the first period of time and the second period of time corresponding to the ratio of the first type of wireless device to the second type of wireless device.

8. The non-transitory computer-readable medium of claim 7, where the one or more instructions, that cause the one or more processors to determine the alteration to the network configuration, cause the one or more processors to:
select a particular frequency or carrier, of a set of frequencies or the multiple carriers via which the set of PRS signals are provided, based on the set of characteristics of the set of wireless devices connected to the network; and
transmit a signaling message to cause a particular wireless device, of the set of wireless devices, to transfer from another frequency or carrier, of the set of frequencies or the multiple carriers, to the particular frequency or carrier.

9. The non-transitory computer-readable medium of claim 7, where the one or more instructions, that cause the one or more processors to determine the alteration to the network configuration, cause the one or more processors to:
select a plurality of time slots associated with the multiple carriers; and
where the one or more instructions, that cause the one or more processors to transmit the set of PRS signals, cause the one or more processors to:
transmit the set of PRS signals via the plurality of time slots associated with the multiple carriers.

10. The non-transitory computer-readable medium of claim 7, where the one or more instructions, that cause the one or more processors to determine the alteration to the network configuration, cause the one or more processors to:
allocate a set of dedicated data sub-channels to a subset of the set of PRS signals for a subset of the set of wireless devices; and
where the one or more instructions, that cause the one or more processors to transmit the set of PRS signals, cause the one or more processors to:
transmit the subset of the set of PRS signals for the subset of the set of wireless devices via the set of dedicated data sub-channels.

11. The non-transitory computer-readable medium of claim 7, where the one or more instructions, when executed by the one or more processors to, further cause the one or more processors to:
utilize a self-organizing network (SON) functionality to synchronize the network configuration alteration for a set of base stations.

12. The non-transitory computer-readable medium of claim 7, where the set of characteristics of the network include at least one of:
a signal to interference plus noise ratio (SINR),
a call quality indicator, or
a signal strength.

13. The non-transitory computer-readable medium of claim 7, where the set of characteristics of the set of wireless devices include at least one of:
a type of a particular wireless device of the set of wireless devices,
a quantity of antennas of the particular wireless device, or
a bandwidth of the particular wireless device.

14. A method, comprising:
determining, by a device, a set of characteristics of a network,
the set of characteristics relating to a set of wireless devices connected to the network,
the set of wireless devices including a first type of wireless device and a second type of wireless device,
the first type of wireless device being a different type of wireless device than the second type of wireless device;
determining, by the device, a ratio of the first type of wireless device of the set of wireless devices to the second type of wireless device of the set of wireless devices,
the first type of wireless device being associated with a first location accuracy requirement,
the second type of wireless device being associated with a second location accuracy requirement,
altering, by the device, a network configuration associated with a set of positioning reference signals (PRS signals) transmitted via the network based on the set of characteristics of the network,
the alteration relating to a characteristic of the set of PRS signals or a resource allocation for providing the set of PRS signals via the network, and
the network configuration including a first network configuration and a second network configuration,
the first network configuration being associated with the first type of wireless device of the set of wireless devices,
the second network configuration being associated with the second type of wireless device of the set of wireless devices, and
the first network configuration being different than the second network configuration; and
transmitting, by the device, the set of PRS signals, using multiple carriers, based on altering the network configuration to enable geolocation to be performed by the set of wireless devices connected to the network,
a first portion of the set of PRS signals being transmitted using the first network configuration corresponding to the first location accuracy requirement for a first period of time of a time interval and a second portion of the set of PRS signals being transmitted using the second network configuration for a second period of time of the time interval,
the first period of time and the second period of time corresponding to the ratio of the first type of wireless device to the second type of wireless device.

15. The method of claim 14, further comprising:
transmitting a signaling message to a particular wireless device, of the set of wireless devices, to identify the alteration.

16. The method of claim 15, where the signaling message includes at least one of:
a radio resource control signaling message, or
an observed time difference of arrival signaling message.

17. The method of claim 14, further comprising:
monitoring the set of characteristics of the network after transmitting the set of PRS signals; and
iteratively causing one or more other alterations to the network configuration based on monitoring the set of characteristics of the network, wherein the one or more other alterations include one of the following:
a quantity of repetitions of the set of PRS signals,
a transmission power of the set of PRS signals,
a set of frequencies or a set of carriers via which the set of PRS signals are provided,
a time slot of the set of PRS signals, or
a bandwidth allocated to the set of PRS signals.

18. The method of claim 14, further comprising:
utilizing a self-organizing network (SON) functionality to synchronize the network configuration alteration for a set of base stations.

19. The method of claim 14, where the set of characteristics of the network include at least one of:
a signal to interference plus noise ratio (SINR),
a call quality indicator, or
a signal strength.

20. The non-transitory computer-readable medium of claim 7, where the first type of wireless device and the second type of wireless device are at least one of:
user equipment (UE); or
an IoT device.

* * * * *